(12) United States Patent
Cai et al.

(10) Patent No.: US 10,146,030 B2
(45) Date of Patent: Dec. 4, 2018

(54) ZOOM LENS

(71) Applicant: Young Optics Inc., Hsinchu (TW)

(72) Inventors: Yuan-Long Cai, Hsinchu (TW);
Chien-Hsiung Tseng, Hsinchu (TW);
Yu-Hung Chou, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 117 days.

(21) Appl. No.: 14/807,901

(22) Filed: Jul. 24, 2015

(65) Prior Publication Data

US 2015/0323769 A1 Nov. 12, 2015

Related U.S. Application Data

(63) Continuation of application No. 14/133,660, filed on Dec. 19, 2013, now Pat. No. 9,122,042.

(30) Foreign Application Priority Data

Jul. 25, 2013 (TW) .............................. 102126705 A

(51) Int. Cl.
*G02B 15/14* (2006.01)
*G02B 15/173* (2006.01)

(52) U.S. Cl.
CPC .......... *G02B 15/14* (2013.01); *G02B 15/173* (2013.01)

(58) Field of Classification Search
CPC ...................................................... G02B 15/14
USPC .......................................................... 359/687
See application file for complete search history.

(56) References Cited

U.S. PATENT DOCUMENTS

2013/0321655 A1\* 12/2013 Abe ..................... G02B 15/173
348/208.11

\* cited by examiner

*Primary Examiner* — Jack Dinh
(74) *Attorney, Agent, or Firm* — JCIPRNET

(57) ABSTRACT

A zoom lens including a first lens group, a second lens group, and a third lens group is provided. The first lens group is disposed between an object side and an image side and has at least one aspheric surface. The second lens group has a positive refractive power and is disposed between the first lens group and the image side. The third lens group has a positive refractive power and is disposed between the second lens group and the image side. The third lens group has at least one aspheric surface. The third lens group is suitable to move relative to the second lens group for focusing.

16 Claims, 16 Drawing Sheets

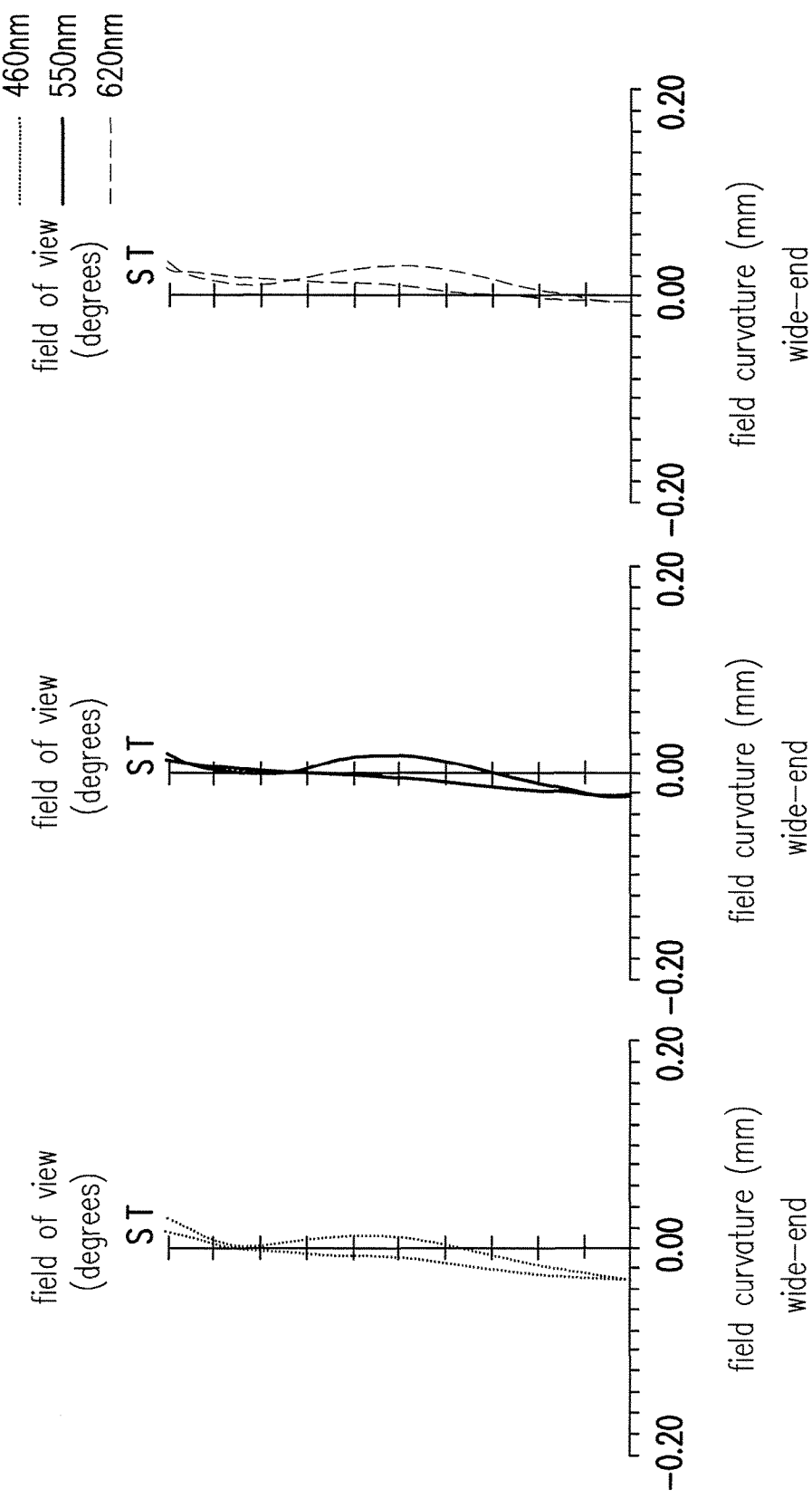

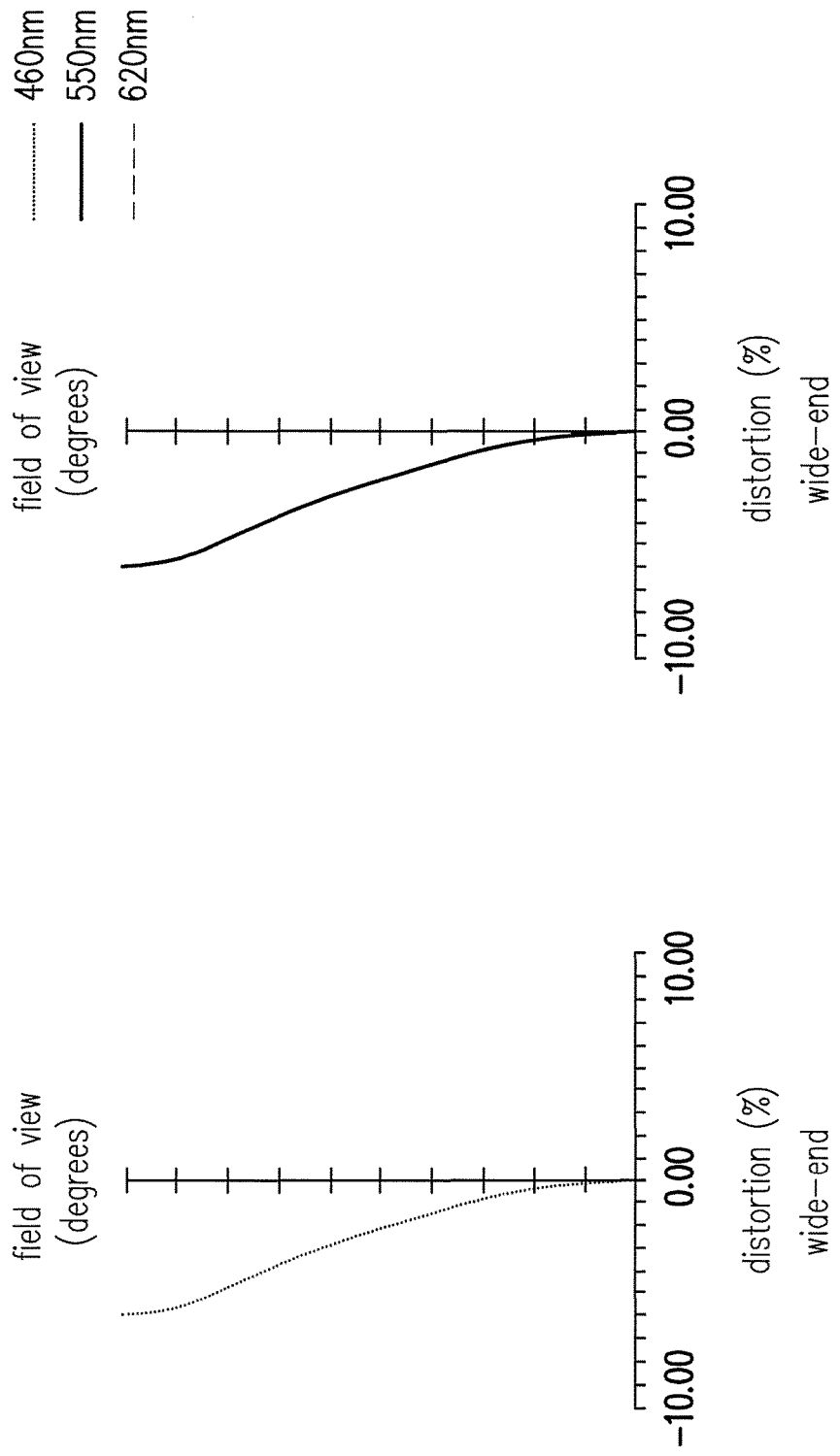

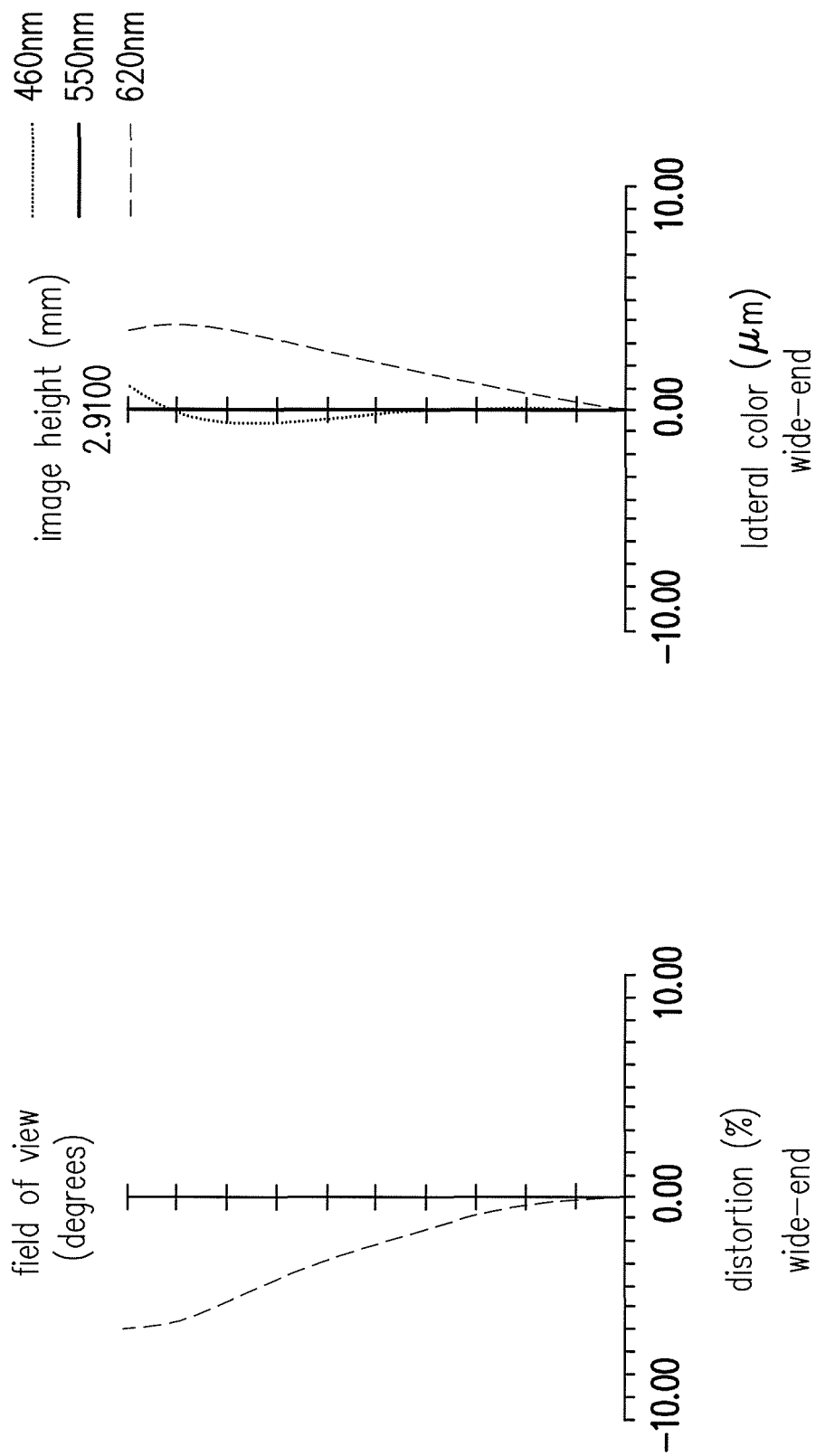

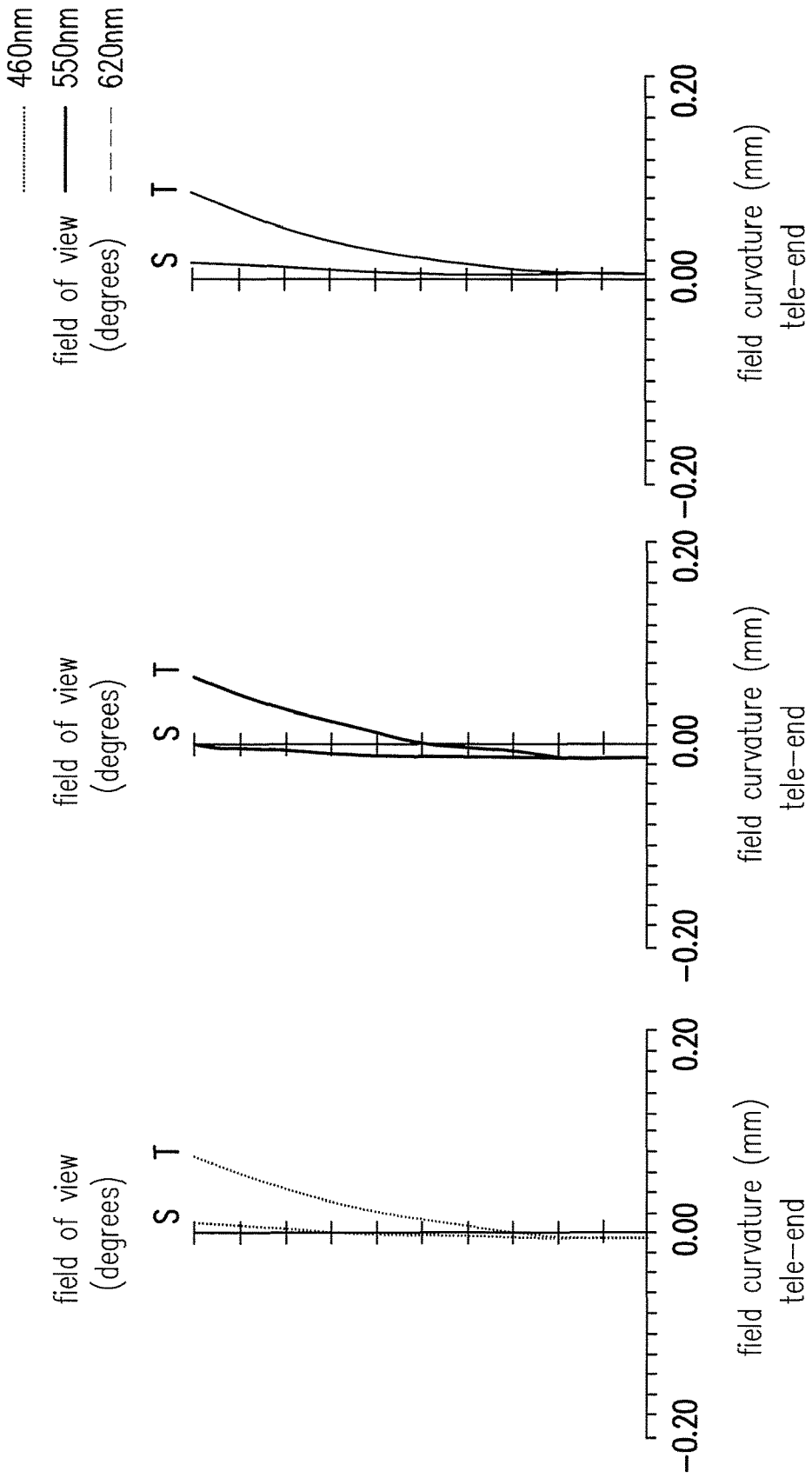

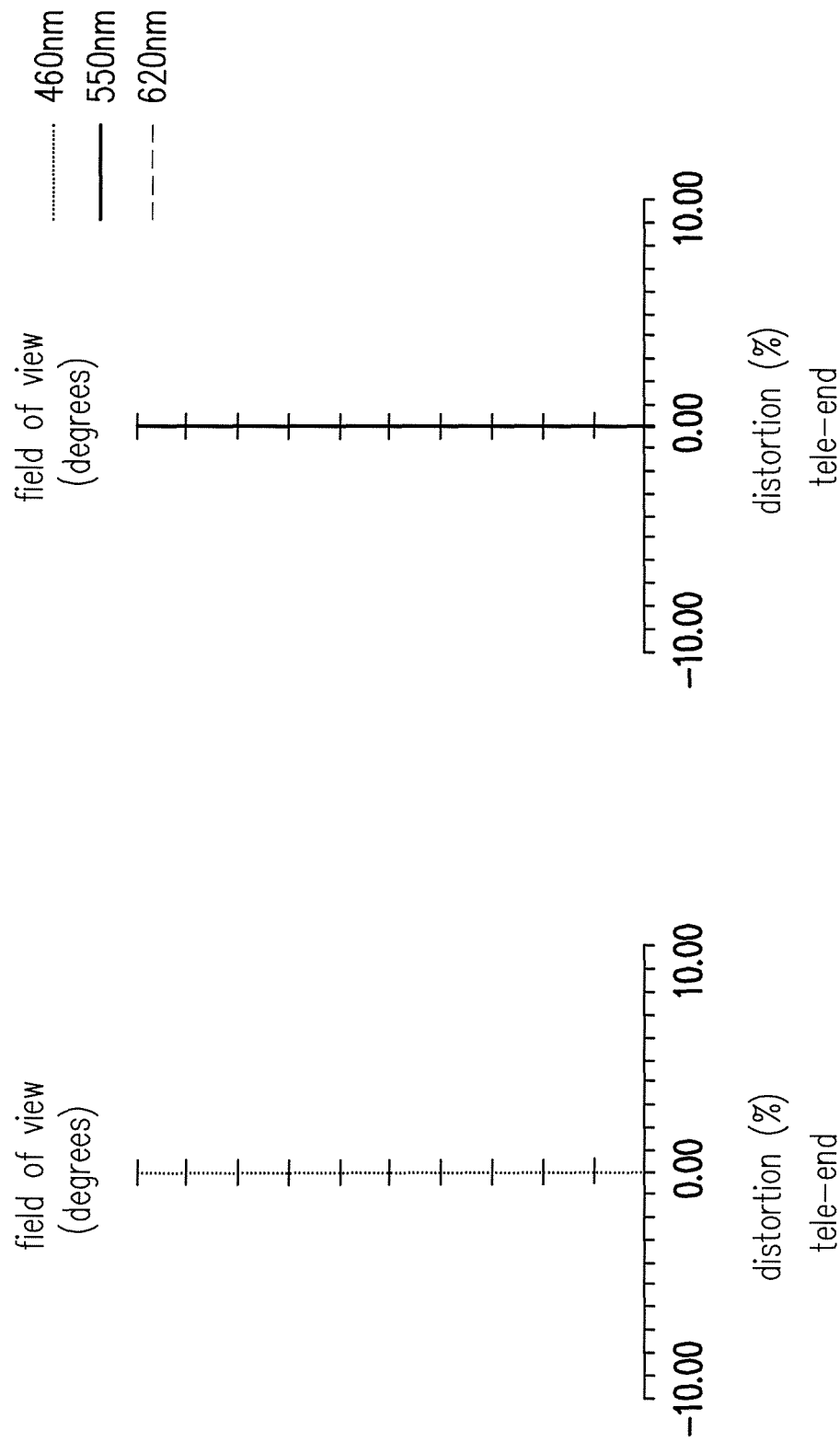

ZOOM LENS

CROSS-REFERENCE TO RELATED APPLICATION

This application is a continuation application of and claims the priority benefit of U.S. application Ser. No. 14/133,660, filed on Dec. 19, 2013, now allowed. The prior U.S. application Ser. No. 14/133,660 claims the priority benefit of Taiwan application serial no. 102126705, filed on Jul. 25, 2013. The entirety of each of the above-mentioned patent applications is hereby incorporated by reference herein and made a part of this specification.

BACKGROUND OF THE INVENTION

Field of the Invention

The invention generally relates to a lens, and more particularly to a zoom lens.

Description of Related Art

With the advances in optical-electronic technologies, image sensing devices (such as a projector, a digital video camera (DVC) and a digital camera have been widely applied in daily life as well as in various industries, so as to replace tasks originally being done by human eye. In the image sensing device, besides qualities of an image sensor (e.g., a charge coupled device (CCD) and a complementary metal oxide semiconductor sensor (CMOS sensor)), a quality of an image being detected can also be decided by a quality of an optical lens. Therefore, how to design a lens to accomplish a preferable image is a major issue highly concerned by lens designers.

In order to achieve effects including wide angle, high zoom magnification, low distortion and higher image quality, a conventional zoom lens adopts a method of a multi-group operation for zooming. However, the zoom lens with the multi-group operation requires use of plural optical elements and mechanical members. If the zoom lens contains too many structural members, an optical length of the zoom lens cannot be reduced, and a price thereof cannot be reduced either. On the other hand, when a number of the mechanical members assembled in the zoom lens are reduced, flexibility in an optical design is limited. Accordingly, a difficulty in the optical design becomes higher. Therefore, how to reduce production costs while maintaining an image quality of the zoom lens has become one of the most important topics to be discussed in the field.

U.S. Pat. Nos. 8,159,758, 8,254,036, 7,933,073, 8,305,693, 5,710,669, 6,989,940, 7,440,194, 5,325,236, 5,864,435, and US patent publication number 20120268831 all provide a zoom lens.

SUMMARY OF THE INVENTION

The invention is directed to a zoom lens having advantages of small size, a large aperture, high magnification, wide angle, low distortion, favorable imaging quality, easy manufacturing process and low costs.

Other objects and advantages of the invention can be further illustrated by the technical features broadly embodied and described as follows.

In order to achieve one or a part of or all of the above advantages or other advantages, an embodiment of the invention provides a zoom lens including a first lens group, a second lens group, a third lens group, and a fourth lens group. The first lens group has a positive refractive power and includes a first lens and a second lens arranged in sequence from an object side to an image side, and refractive powers of the first lens and the second lens are respectively negative and positive. The second lens group has a negative refractive power and is disposed between the first lens group and the image side. The second lens group includes a third lens, a fourth lens and a fifth lens arranged in sequence from the object side to the image side, and refractive powers of the third lens, the fourth lens and the fifth lens are respectively negative, negative, and positive. The third lens group has a positive refractive power and is disposed between the second lens group and the image side. The third lens group includes a sixth lens, and a refractive power of the sixth lens is positive. The fourth lens group has a positive refractive power and is disposed between the third lens group and the image side. The fourth lens group includes a seventh lens, an eighth lens and a ninth lens arranged in sequence from the object side to the image side, refractive powers of the seventh lens, the eighth lens and the ninth lens are respectively positive, negative and positive, and at least one of the seventh lens, the eighth lens and the ninth lens is an aspheric lens.

In an embodiment of the invention, the third lens group further includes an aperture stop, disposed between the second lens group and the sixth lens, and an aperture size of the aperture stop remains unchanged.

In an embodiment of the invention, positions of the first lens group and the third lens group remain fixed in the zoom lens, the second lens group is suitable to move relative to the first lens group and the third lens group for the zoom lens to zoom between a wide-end and a tele-end, and the fourth lens group is suitable to move relative to the first lens group and the third lens group for focusing.

In an embodiment of the invention, the zoom lens satisfies $0.7<H/f_w$, wherein $f_w$ is an effective focal length (EFL) of the zoom lens switched to the wide-end, and H is a half image height.

In an embodiment of the invention, the zoom lens satisfies $|f_w/f2|<0.6$, wherein $f_w$ is an effective focal length of the zoom lens switched to the wide-end, and f2 is an effective focal length of the second lens group.

In an embodiment of the invention, the zoom lens satisfies $|f_w/f4|<0.5$, wherein $F_w$ is an effective focal length of the zoom lens switched to the wide-end, and f4 is an effective focal length of the fourth lens group.

In an embodiment of the invention, at least one of the third lens, the fourth lens and the fifth lens is an aspheric lens.

In an embodiment of the invention, the zoom lens satisfies $1.2<|fn_T/fn_W|\leq 2.5$, wherein $fn_T$ is a f-number of the zoom lens switched to a tele-end, and $fn_W$ is a f-number of the zoom lens switched to a wide-end.

In an embodiment of the invention, the first lens, the second lens, third lens, the fourth lens, the fifth lens, the sixth lens, the seventh lens, the eighth lens and the ninth lens are respectively a convex-concave lens with a convex surface facing the object side, a concave-convex lens with a concave surface facing the image side, a convex-concave lens with a convex surface facing the object side, a biconcave lens, a biconvex lens, a concave-convex lens with a concave surface facing the image side, a biconvex lens, a biconcave lens and a biconvex lens.

In an embodiment of the invention, the first lens and second lens form a double cemented lens.

In an embodiment of the invention, each of the fourth lens and the seventh lens is an aspheric lens.

An embodiment of the invention provides a zoom lens including a first lens group, a second lens group, and a third lens group. The first lens group is disposed between an object side and an image side and has at least one aspheric surface. The second lens group has a positive refractive power and is disposed between the first lens group and the image side. The third lens group has a positive refractive power and is disposed between the second lens group and the image side. The third lens group has at least one aspheric surface. The third lens group is suitable to move relative to the second lens group for focusing.

An embodiment of the invention provides a zoom lens including a first lens group, a second lens group, and a third lens group. The first lens group is disposed between an object side and an image side. The second lens group has a positive refractive power and is disposed between the first lens group and the image side. The third lens group has a positive refractive power and is disposed between the second lens group and the image side. A zoom ratio of the zoom lens when zooming between a wide-end and a tele-end ranges from 1.25 to 1.5, and the zoom lens satisfies $|f_w/f3|<0.5$, wherein $f_w$ is an effective focal length of the zoom lens switched to the wide-end, and f3 is an effective focal length of the third lens group.

An embodiment of the invention provides a zoom lens including a first lens, a second lens, a third lens, a fourth lens, a fifth lens, a sixth lens, a seventh lens, and an eighth lens arranged from an object side towards an image side and an aperture stop. Refractive powers of the first lens, the second lens, the third lens, the sixth lens, the seventh lens, and the eighth lens are negative, positive, negative, positive, negative, and positive, respectively. The aperture stop remains fixed in the zoom lens. The zoom lens satisfies $0.7<H/f_w$, wherein $f_w$ is an effective focal length of the zoom lens switched to a wide-end, and H is a half image height.

In summary, the zoom lens according to the embodiments of the invention is provided with the first lens group, the second lens group, the third lens group and the fourth lens group with refractive powers respectively being positive, negative, positive and positive. The fourth lens group of the zoom lens which is designed to reduce the aberration has at least one aspheric lens. Accordingly, the zoom lens according to embodiment of the invention can provide favorable optical imaging quality.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIG. 2A to FIG. 2J are optical simulation data diagrams of the zoom lens depicted in FIG. 1A at the wide-end.

FIG. 3A to FIG. 3J are optical simulation data diagrams of the zoom lens depicted in FIG. 1B at the tele-end.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to." Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
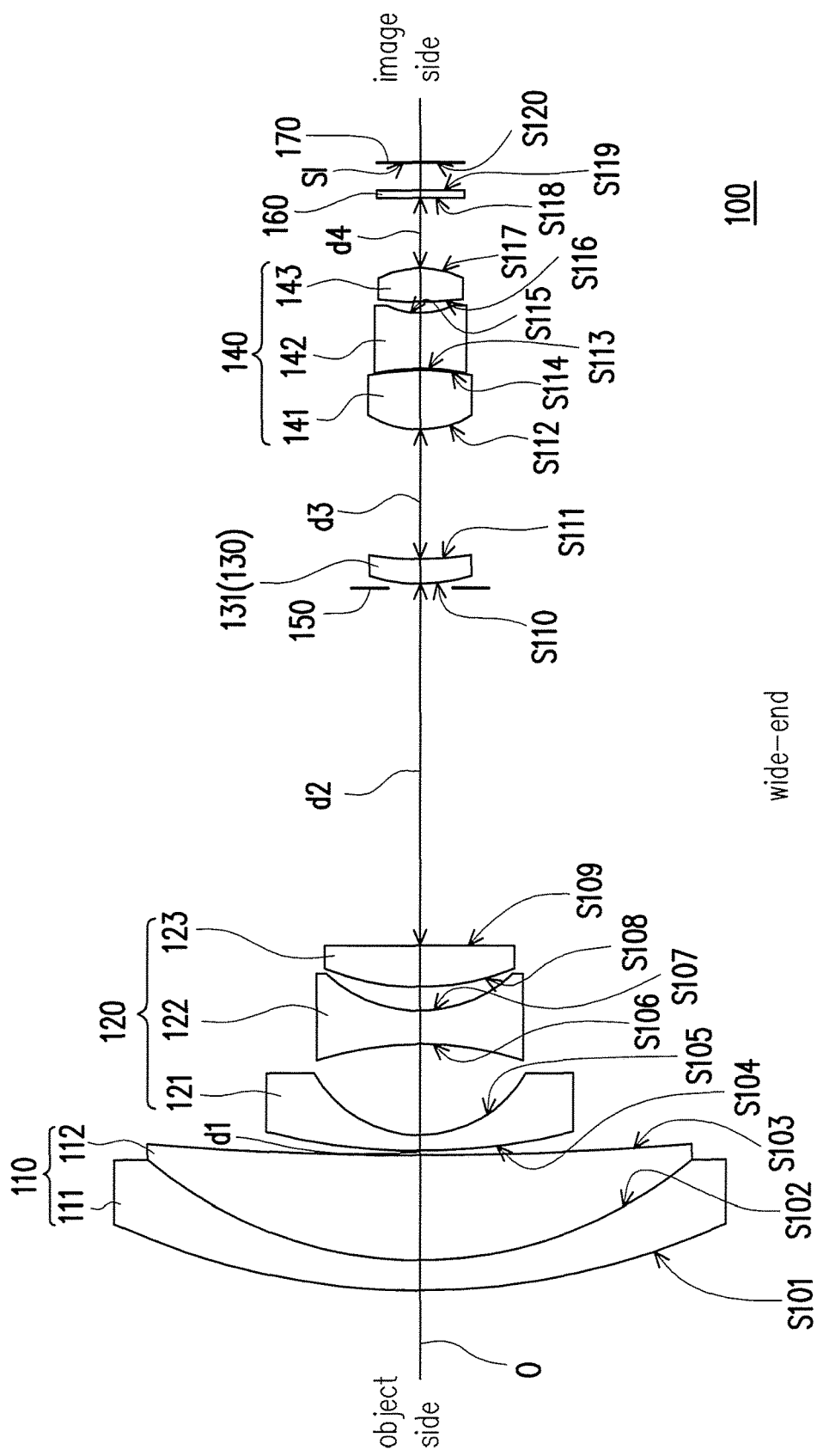
FIG. 1A to FIG. 1B are schematic diagrams illustrating a zoom lens according to an embodiment of the invention with a focal length respectively at a wide-end and a tele-end.
Figure 1B:
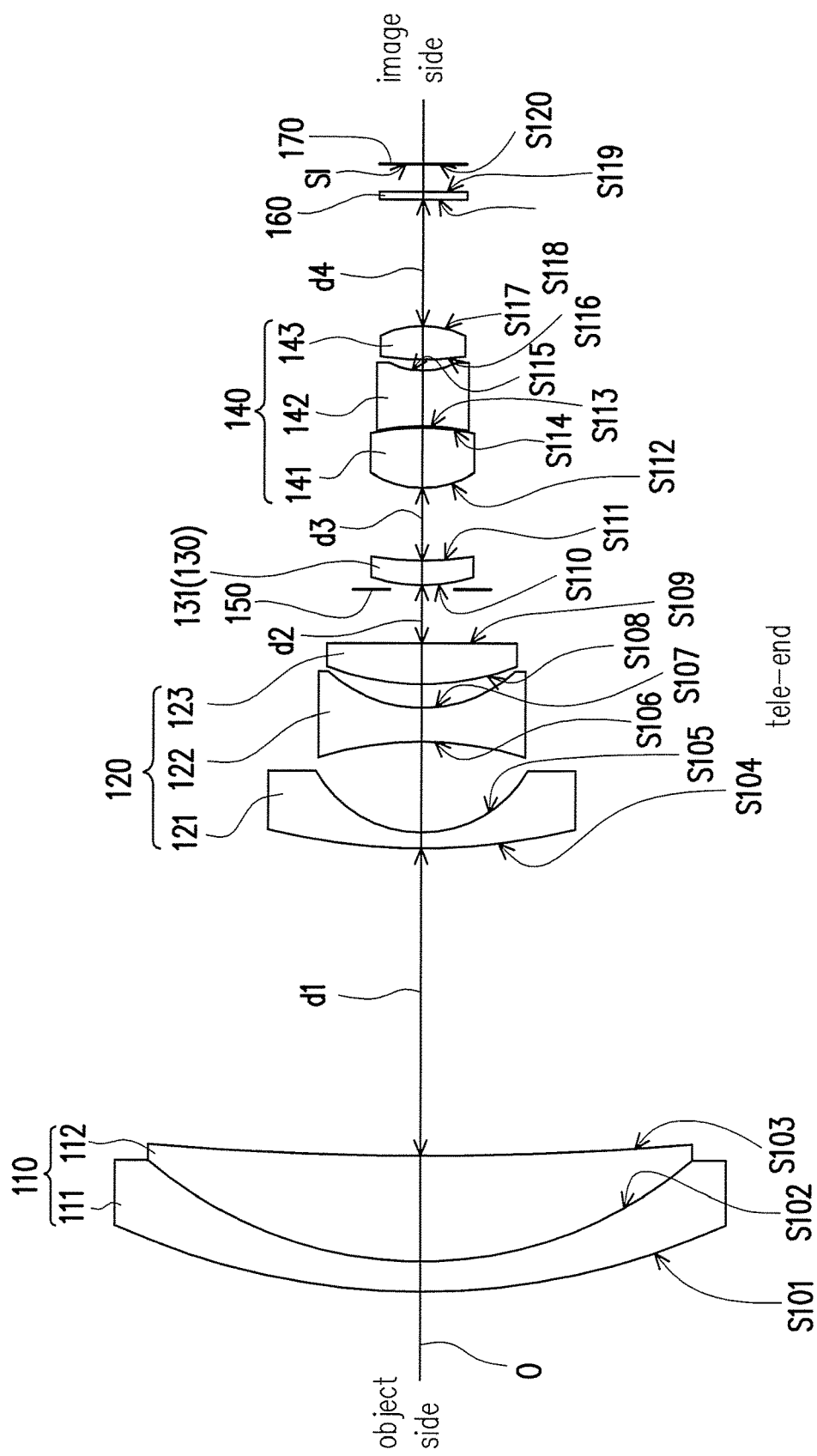

FIG. 1A to FIG. 1B are schematic diagrams illustrating a zoom lens 100 according to an embodiment of the invention with a focal length respectively at a wide-end and a tele-end. Referring to FIG. 1A and FIG. 1B, in the embodiment, the zoom lens 100 includes a first lens group 110, a second lens group 120, a third lens group 130 and a fourth lens group 140 respectively arranged in sequence from an object side to an image side. The zoom lens 100 has an optical axis O. The first lens group 110 has a positive refractive power and includes a first lens 111 and a second lens 112 arranged in sequence from the object side to the image side, and refractive powers of the first lens 111 and the second lens 112 are respectively negative and positive. The second lens group 120 has a negative refractive power and is disposed between the first lens group 110 and the image side. The second lens group 120 includes a third lens 121, a fourth lens 122 and a fifth lens 123 arranged in sequence from the object side to the image side, and refractive powers of the third lens 121, the fourth lens 122 and the fifth lens 123 are respectively negative, negative, and positive. The third lens group 130 has a positive refractive power and is disposed between the second lens group 120 and the image side. The third lens group 130 includes a sixth lens 131, and a refractive power of the sixth lens 131 is positive. The fourth lens group 140 has a positive refractive power and is disposed between the third lens group 130 and the image side. The fourth lens group 140 includes a seventh lens 141, an eighth lens 142 and a ninth lens 143 arranged in sequence from the object side to the image side, and refractive powers of the seventh lens 141, the eighth lens 142 and the ninth lens 143 are respectively positive, negative, and positive.

Specifically, in the embodiment, positions of the first lens group 110 and the third lens group 130 remain fixed in the zoom lens 100. The second lens group 120 is suitable to move relative to the first lens group 110 and the third lens group 130 for the zoom lens 100 to zoom between the wide-end and the tele-end. A distance d1 along the optical axis O between the first lens group 110 and the second lens group 120 and a distance d2 along the optical axis O between the second lens group 120 and the third lens group 130 are variable. And the fourth lens group 140 is suitable to move relative to the first lens group 110 and the third lens group 130 for focusing.

More specifically, as shown in FIG. 1A and FIG. 1B, when the second lens group 120 and the fourth lens group 140 are moving towards each other, the zoom lens 100 switches from the wide-end to the tele-end. In this case, variable distances d2 and d3 of the zoom lens 100 become smaller and variable distances d1 and d4 become greater, so that the focal length of the zoom lens 100 changes from the wide-end (as shown in FIG. 1A) to the tele-end (as shown in FIG. 1B). On the contrary, when the second lens group 120 and the fourth lens group 140 are moving away from each other, the zoom lens 100 switches from the tele-end to the wide-end. In this case, the variable distances d2 and d3 of the zoom lens 100 become greater and the variable distances d1 and d4 become smaller, so that the focal length of the zoom lens 100 changes from the tele-end (as shown in FIG. 1B) to the wide-end (as shown in FIG. 1A). More specifically, in the embodiment, the zoom lens 100 satisfies $|f_w/f2|<0.6$, in which $f_w$ is an effective focal length (EFL) of the zoom lens 100 switched to the wide-end, and f2 is an effective focal length of the second lens group 120. Further, in the embodiment, the zoom lens 100 also satisfies $|f_w/f4|<0.5$, in which f4 is an effective focal length of the fourth lens group 140.

On the other hand, in the embodiment, the third lens group 130 further includes an aperture stop 150 disposed between the second lens group 120 and the sixth lens 131. More specifically, the aperture stop 150 is located on a surface S110 of the sixth lens 131 facing the second lens group 120. In other words, during a zooming process of the zoom lens 100, the aperture stop 150 remains fixed.

Furthermore, in the embodiment, an aperture size of the aperture stop 150 remains unchanged. In the embodiment, when zooming between the wide-end and the tele-end, a f-number (i.e., a ratio of the effective focal length to an aperture diameter in the zoom lens 100) of the zoom lens 100 does not change much. This is why the zoom lens 100 of the embodiment can adopt the aperture stop 150 having the aperture size being fixed instead of adopting a variable iris. Accordingly, the mechanical members and driving motors in the zoom lens 100 can be reduced to reduce a size of the zoom lens 100, so as to reduce the difficulty of assembling the zoom lens 100 and the production costs of the zoom lens 100. More specifically, in the embodiment, the zoom lens 100 satisfies $1.2<|fn_T/fn_W|\leq 2.5$, in which $fn_T$ is a f-number of the zoom lens 100 switched to a tele-end, and $fn_W$ is a f-number of the zoom lens 100 switched to a wide-end.

Detailed description is provided below as to further explain materials and lens structures of the zoom lens 100.

In the zoom lens 100 as described above, each of the first lens 111 and the second lens 112 of the first lens group 110 and the sixth lens 131 of the third lens group 130 is, for example, a spherical lens. At least one of the third lens 121, the fourth lens 122 and the fifth lens 123 in the second lens group 120 is an aspheric lens. At least one of the seventh lens 141, the eighth lens 142 and the ninth lens 143 in the fourth lens group 140 is an aspheric lens. In the embodiment, the fourth lens 122 and the seventh lens 141 are aspheric lenses, and each of the third lens 121, the fifth lens 123, the eighth lens 142 and the ninth 143 is a spherical lens, but the invention is not limited thereto.

More specifically, in the embodiment, the first lens 111 is a convex-concave lens with a convex surface facing the object side. The second lens 112 is a concave-convex lens with a concave surface facing the image side. Third lens 121 is a convex-concave lens with a convex surface facing the object side. The fourth lens 122 is a biconcave lens. The fifth lens 123 is a biconvex lens. The sixth lens 131 is a concave-convex lens with a concave surface facing the image side. The seventh lens 141 is a biconvex lens. The eighth lens 142 is a biconcave lens. And the ninth lens 143 is a biconvex lens. Furthermore, as shown in FIG. 1A, in the embodiment, the first lens 111 and the second lens 112 of the first lens group 110 form a double cemented lens.

In the embodiment, materials of the first lens 111 to the ninth lens 143 are, for example, glass or plastic. However, since commonly a lens may generate a dispersion from different wavelengths of light, thus a blue light and a red light cannot be focused on a plane within the same distance, thereby causing a chromatic aberration. In order to solve the chromatic aberration as mentioned above, in the embodiment, an abbe number of the ninth lens 143 can be, for example, greater than 80, but the invention is not limited thereto. In other words, in the embodiment, the material of ninth lens 143 is, for example, a material of a low dispersion. Accordingly, the zoom lens 100 can also have favorable effect of aberration correction so as to provide a more preferable imaging quality.

Further, in the embodiment, when the zoom lens 100 is used for imaging, an IR cut filter 160 and an image sensing element 170 can be disposed on the image side, in which a surface S120 is an imaging surface SI of the image sensing element 170. Further, in the embodiment, the image sensing element 170 is, for example, a charge coupled device (CCD) or a complementary metal oxide semiconductor (CMOS) image sensing element. Moreover, a person skilled in the art can understand that, a protective cover (not illustrated) can be disposed on the surface S 120 of the image sensing element 170, and the protective cover can be of a glass material so as to protect the image sensing element 170 from damages and influences of dust.

More specifically, in the embodiment, the zoom lens 100 satisfies $0.7<H/f_w$, in which $f_w$ is an effective focal length of the zoom lens 100 switched to the wide-end, and H is a half image height. In the embodiment, the half image height is defined as a distance from a point of an image frame formed on the imaging surface SI of the imaging sensing element 170 on the object side, being farthest away from the optical axis O of the zoom lens 100, to the optical axis O, and said distance refers to a distance in a direction perpendicular to the optical axis O. In the embodiment, since an optical axis of the image sensing element 170 coincides with the optical axis O of the zoom lens 100, the half image height is a half of a diagonal length of the image frame formed on the imaging surface SI.

More specifically, since the zoom lens 100 of the embodiment satisfies $H/f_w>0.7$, the zoom lens 100 can accomplish a field of view (FOV) being wider while maintaining favorable imaging quality. Herein, the field of view of lens 100 is 2ω, which is a double of an included angle between a light that is incident on or emerged from a most marginalized edge of the first lens 111 and the optical axis O.

Furthermore, in case the zoom lens 100 is designed to satisfy H/f$_w$<0.7, the field of view being relatively smaller can be obtained by the zoom lens 100, e.g., the field of view being less than 70°. Therefore, the zoom lens 100 of the embodiment satisfying H/f$_w$>0.7 allows the zoom lens 100 to have the field of view being greater.

An embodiment of the zoom lens 100 is described below. However, the invention is not limited to the data listed below. It should be known to those ordinary skilled in the art that various modifications and variations can be made to the structure of the present invention without departing from the scope or spirit of the invention after referring to the invention.

TABLE 1

| Surface | Radius of Curvature (mm) | Distance (mm) | Refractive Index | Abbe Number | Notes |
|---|---|---|---|---|---|
| Object Side | Infinity | 1000 | | | |
| S101 | 51.61 | 2.00 | 1.85 | 23.8 | First Lens |
| S102 | 29.20 | 6.82 | 1.81 | 40.9 | Second Lens |
| S103 | 213.97 | Variable Distance (d1) | | | |
| S104 | 44.87 | 1.00 | 1.83 | 37.3 | Third Lens |
| S105 | 8.41 | 5.98 | | | |
| S106 | −21.09 | 2.29 | 1.53 | 56.0 | Fourth Lens |
| S107 | 8.10 | 1.63 | | | |
| S108 | 18.38 | 2.7 | 1.85 | 23.8 | Fifth Lens |
| S109 | −363.03 | Variable Distance (d2) | | | |
| S110 | 13.25 | 1.65 | 1.53 | 48.8 | Sixth Lens (Aperture Stop) |
| S111 | 28.68 | Variable Distance (d3) | | | |
| S112 | 6.44 | 3.86 | 1.51 | 64.1 | Seventh Lens |
| S113 | −20.73 | 0.12 | | | |
| S114 | −359.35 | 3.80 | 1.85 | 23.8 | Eighth Lens |
| S115 | 7.89 | 0.55 | | | |
| S116 | 35.72 | 2.25 | 1.50 | 81.6 | Ninth Lens |
| S117 | −7.39 | Variable Distance (d4) | | | |
| S118 | Infinity | 0.40 | 1.52 | 64.2 | Infrared Cut Filter |
| S119 | Infinity | 2.00 | | | |
| S120 | Infinity | 0.00 | | | Image Sensing Element |

In Table 1, "Radius of Curvature" refers to a radius of curvature of each surface, and "Distance" refers to a distance between two adjacent surfaces along the optical axis O. For instance, "Distance" for the surface S101 is a distance from the surface S101 to the surface S102 on the optical axis O. "Thickness," "Refractive Index," and "Abbe number" corresponding to each of the lenses listed in the "Notes" column can be found in the corresponding values for the distance, refractive index, and abbe number from each row. In addition, the surface S101 is a surface of the first lens 111 facing the object side; the surface 5102 is a surface of the first lens 111 contacting with the second lens 112; and the surface S103 is a surface of the second lens 112 facing the image side. The surfaces S104 and S105 are two surfaces of the third lens 121. The surfaces S106 and S107 are two surfaces of the fourth lens 122. The surfaces S108 and S109 are two surfaces of the fifth lens 123. The surfaces S110 and S111 are two surfaces of the sixth lens 131, and the aperture stop 150 is located on the surface S110 of the sixth lens 131 facing the object side. The surfaces S112 and S113 are two surfaces of the seventh lens 141. The surfaces S114 and S115 are two surfaces of the eighth lens 142. The surfaces S116 and S117 are two surfaces of the ninth lens 143. The surfaces S118 and S119 are two surfaces of the IR cut filter 160. The surface S120 is the imaging surface SI of the image sensing element 170.

In view of above, the surfaces S106, S107, S112 and S113 are of aspheric surfaces, and a formula of the aspheric surfaces is defined as follows.

$$Z = \frac{(1/R)H^2}{1+\sqrt{1-(1+K)(H/R)^2}} + AH^4 + BH^6 + CH^8 + DH^{10}$$

Therein, Z is a sag along a direction of the optical axis O. R is a radius of osculating sphere, which is also the radius of curvature near the optical axis O (the radius of curvatures for the S106, S107, S112 and S113 in the Table). K is a conic constant. H is an aspheric height, which is a height from a center of the lens to an edge of the lens. In view of the formula, it can be known that different values of H are corresponding to different values of Z. A, B, C, and D are aspheric coefficients. The aspheric coefficients and K values of the surfaces S106, S107, S112 and S113 are as shown in Table 2.

TABLE 2

| Surface | K | A | B | C | D |
|---|---|---|---|---|---|
| S106 | 0 | 4.0781E−004 | −1.2589E−005 | 1.8610E−007 | −1.2348E−009 |
| S107 | 0 | 3.1538E−005 | −2.0226E−005 | 3.4879E−007 | −3.3983E−009 |
| S112 | 0 | −8.2879E−005 | 1.1350E−005 | 4.0413E−007 | −4.4454E−008 |
| S113 | 0 | 1.1939E−003 | 5.0820E−006 | 2.1681E−006 | −1.5193E−007 |

In Table 3, a number of important parameters gathered when the focal length of the zoom lens 100 is at the wide-end and the tele-end is provided, which includes the effective focal length, the field of view, the f-number and the variable distances d1, d2, d3 and d4.

TABLE 3

|  |  | Wide-end | Tele-end |
|---|---|---|---|
| EFL (mm) |  | 3.09 | 14.86 |
| F-number |  | 1.94 | 3.0 |
| FOV (degrees) |  | 90.00° | 21.44° |
| Variable | d1 | 0.25 | 23.86 |
| Distance | d2 | 23.85 | 0.23 |
| (mm) | d3 | 8.47 | 0.62 |
|  | d4 | 4.58 | 12.43 |

As shown in Table 3, since the f-number of the zoom lens 100 of the embodiment can be as small as 1.94, thus an advantage of larger aperture is provided. Meanwhile, as a ratio of the zoom lens 100 when zooming between the wide-end and the tele-end being approximately 1.5, the f-number can maintain stabilized, thus an advantage of configuration without adjustable aperture (i.e., a variable iris) is provided. In addition, since the field of view of the zoom lens 100 at the wide-end reaches 90°, an advantage of wide angle is provided.

Figure 2A:
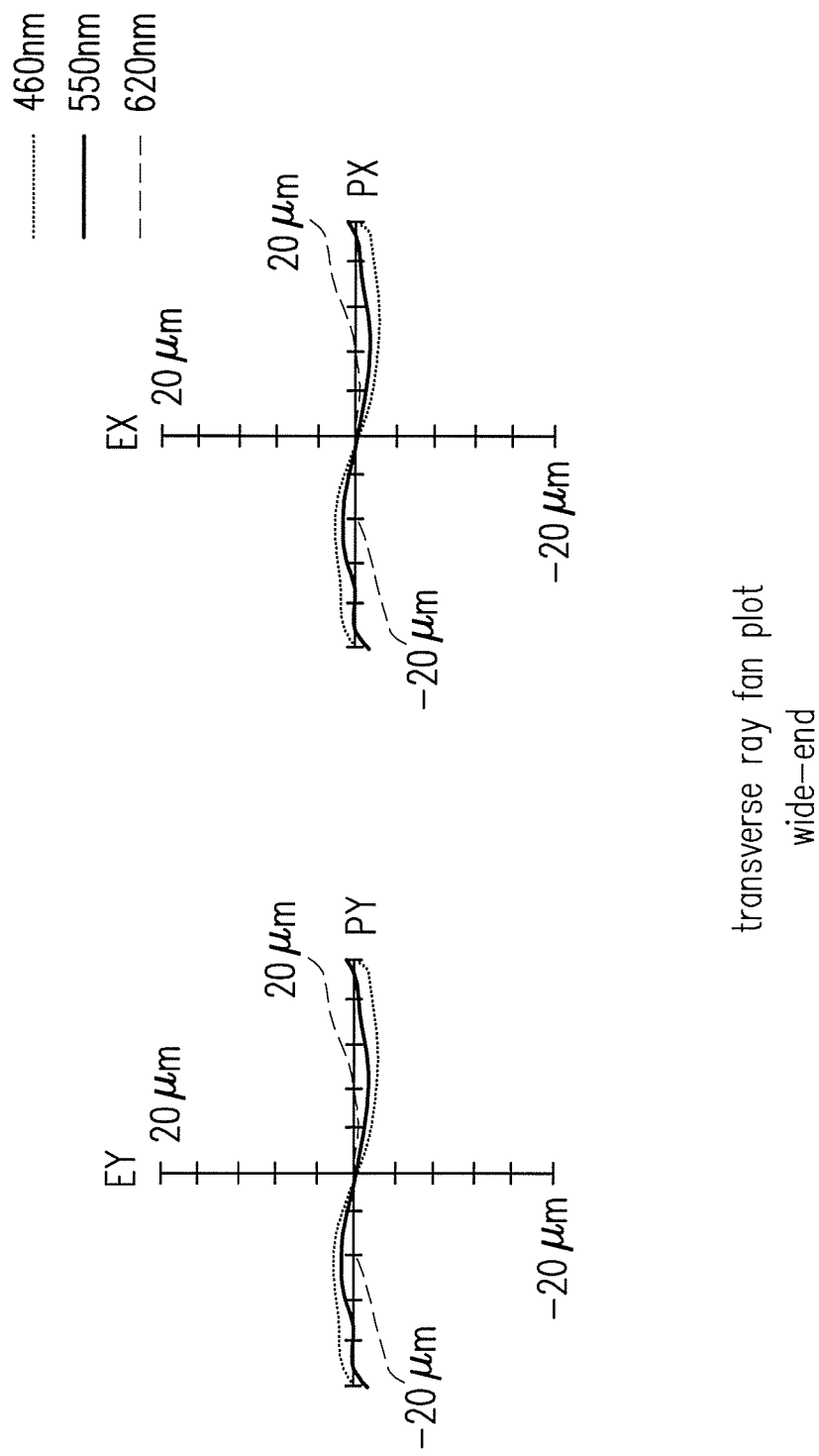
Figure 2B:
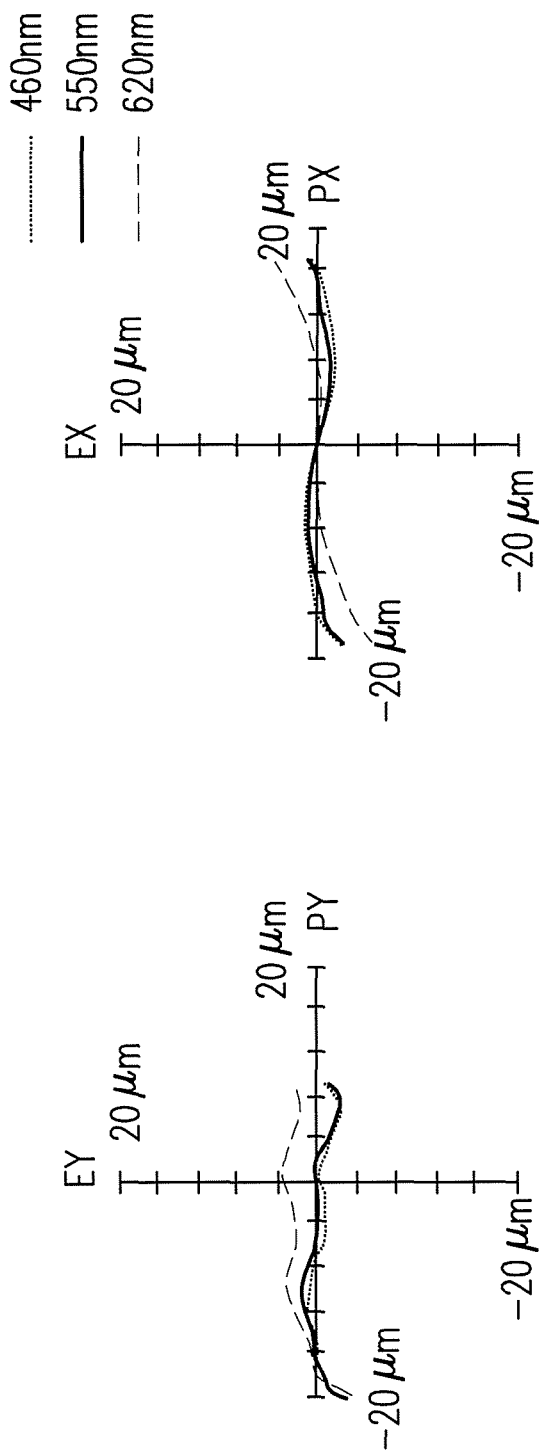
Figure 2C:
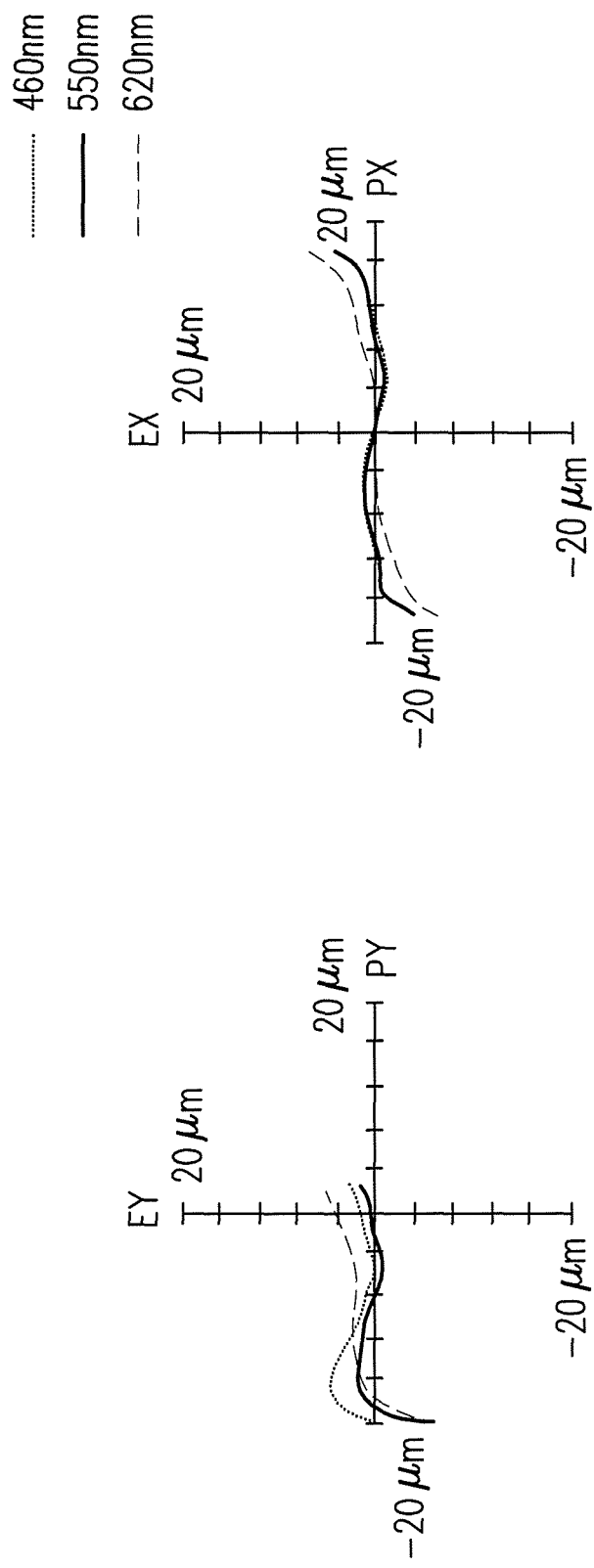
Figure 3A:
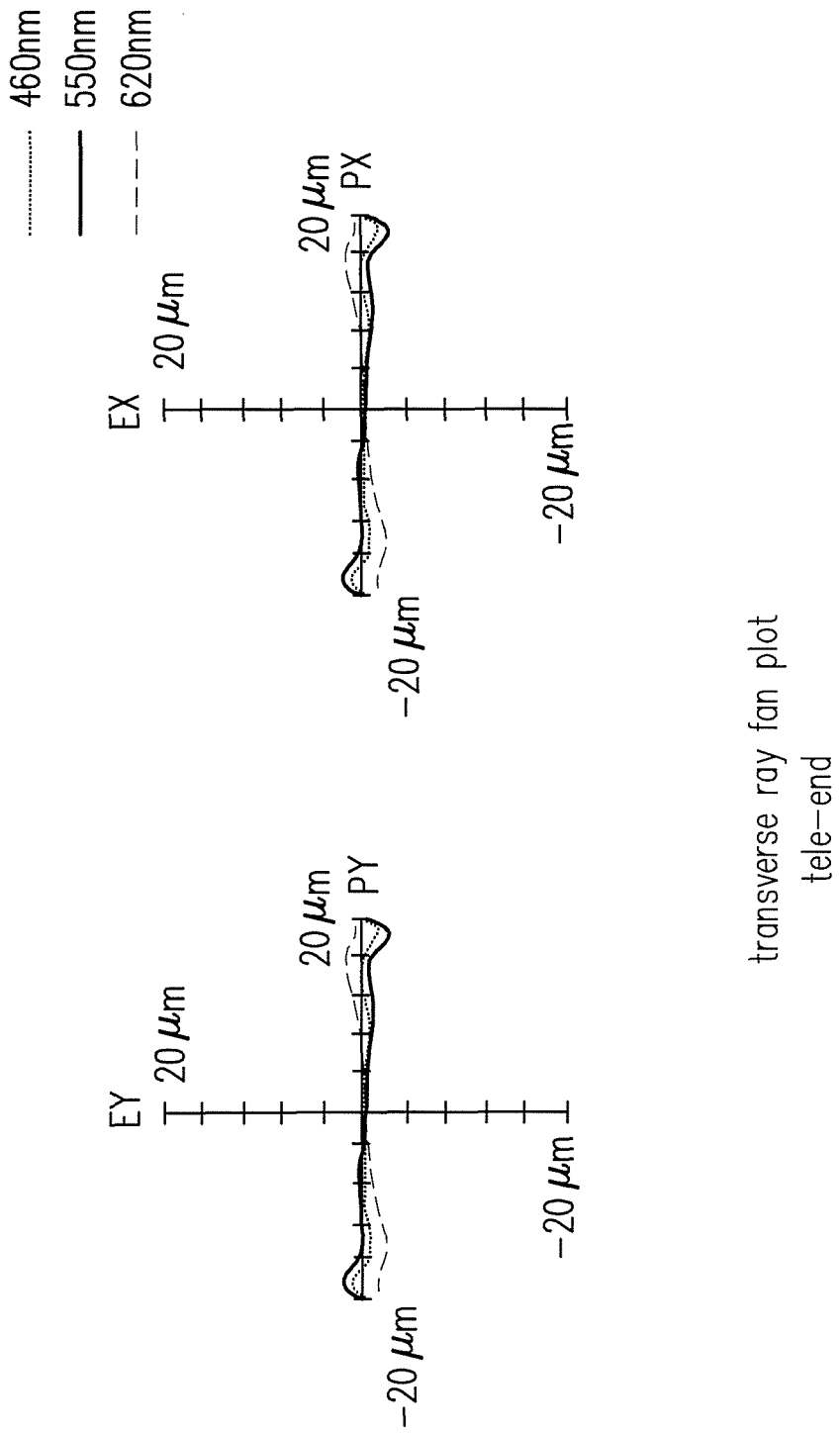
Figure 3B:
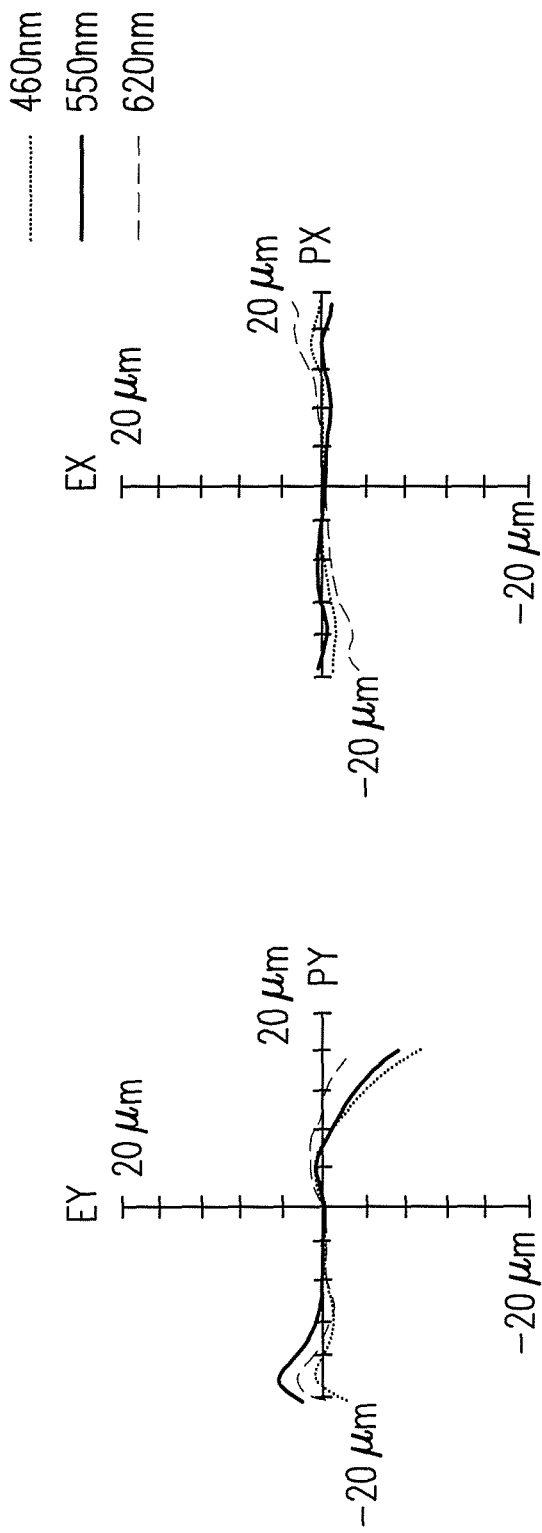
Figure 3C:
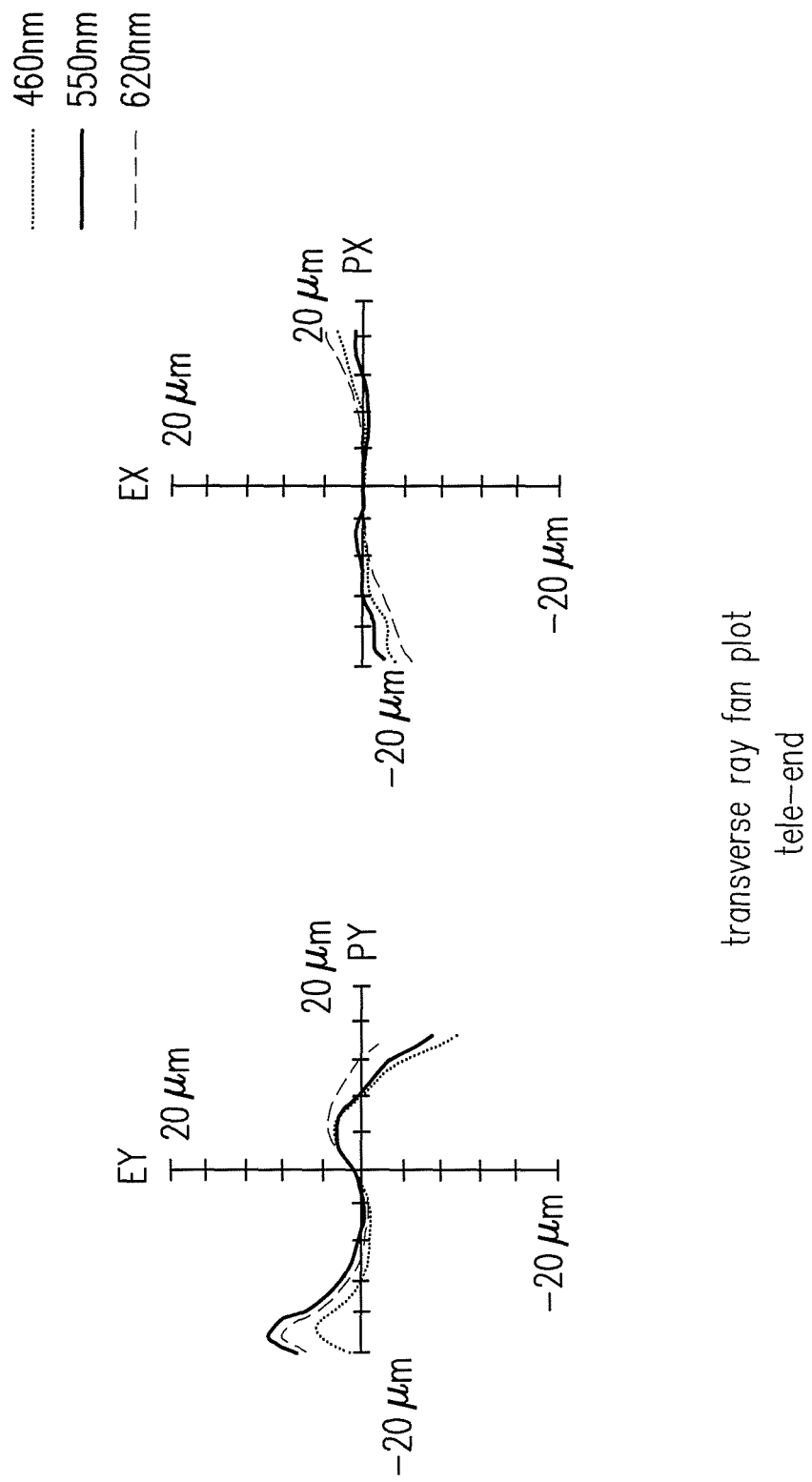
Figures 3I, 3J:
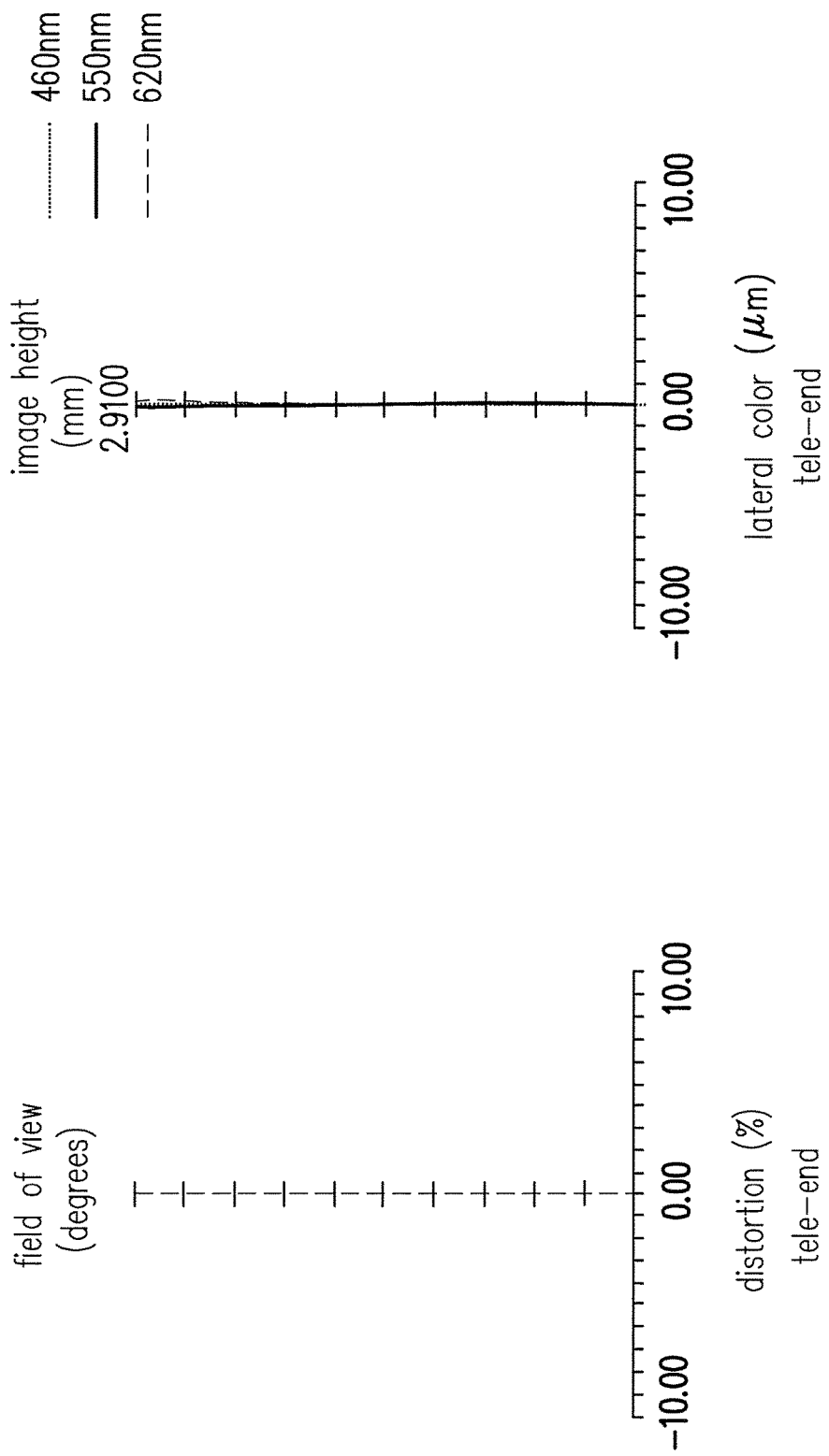

FIG. 2A to FIG. 2J are optical simulation data diagrams of the zoom lens depicted in FIG. 1A at the wide-end. FIG. 3A to FIG. 3J are optical simulation data diagrams of the zoom lens depicted in FIG. 1B at the tele-end. More specifically, FIG. 2A to FIG. 2C are respectively transverse ray fan plots of images at different fields (i.e., at a field being 0, a field being 0.7 and a field being 1, in which the field being 1 is a maximum field). Therein, a coordinate of a horizontal axis refers a position where a light ray passes through the aperture stop 150, and a vertical axis refers to a distance between a position where the light ray forming an image on an image plane and a position where a chief ray forming an image on the image plane. Further, FIG. 2A to FIG. 2C are optical simulation data diagrams made utilizing a light with wavelengths being 460 nm, 550 nm and 620 nm. FIG. 2D to FIG. 2F are field curvatures diagrams made utilizing the light with the wavelengths being 460 nm, 550 nm and 620 nm, respectively. Therein, a horizontal axis refers to a distance from a focal plane, and a vertical axis refers to the field of view from 0 to a maximum value being 44.99°. Further, in the field curvatures diagrams of FIG. 2D to FIG. 2F, S represents data of a sagittal direction, and T represents data of a tangential direction. FIG. 2G to FIG. 2I are distortion diagrams made utilizing the light with the wavelengths being 460 nm, 550 nm and 620 nm, respectively. Therein, a horizontal axis refers to a distortion of a specific percentage, and a vertical axis refers to the field of view from 0 to a maximum value being 44.99°. FIG. 2J is a lateral color diagram made utilizing the light with the wavelengths being 460 nm, 550 nm and 620 nm, respectively. Therein, a horizontal axis refers to a distance from the image of the wavelength being 550 nm, and a vertical axis refers to the field of view from 0 to the maximum value. FIG. 3A to FIG. 3J respectively correspond to FIG. 2A to FIG. 2J, a difference between their simulation conditions is that the data obtained in FIG. 3A to FIG. 3J are obtained from the tele-end, whereas the rest of simulation conditions thereof are respectively identical to the same in FIG. 2A to FIG. 2J.

As shown in FIG. 2A to FIG. 2J and FIG. 3A to FIG. 3J, the zoom lens 100 has favorable imaging quality at the tel-end and the wide-end in terms of the distortion, the field curvature and the lateral color. Therefore, the zoom lens 100 of the embodiment can provide advantages of small size, large aperture, high magnification, wide angle, low distortion and low costs, while maintaining favorable imaging quality.

Figure 4A:
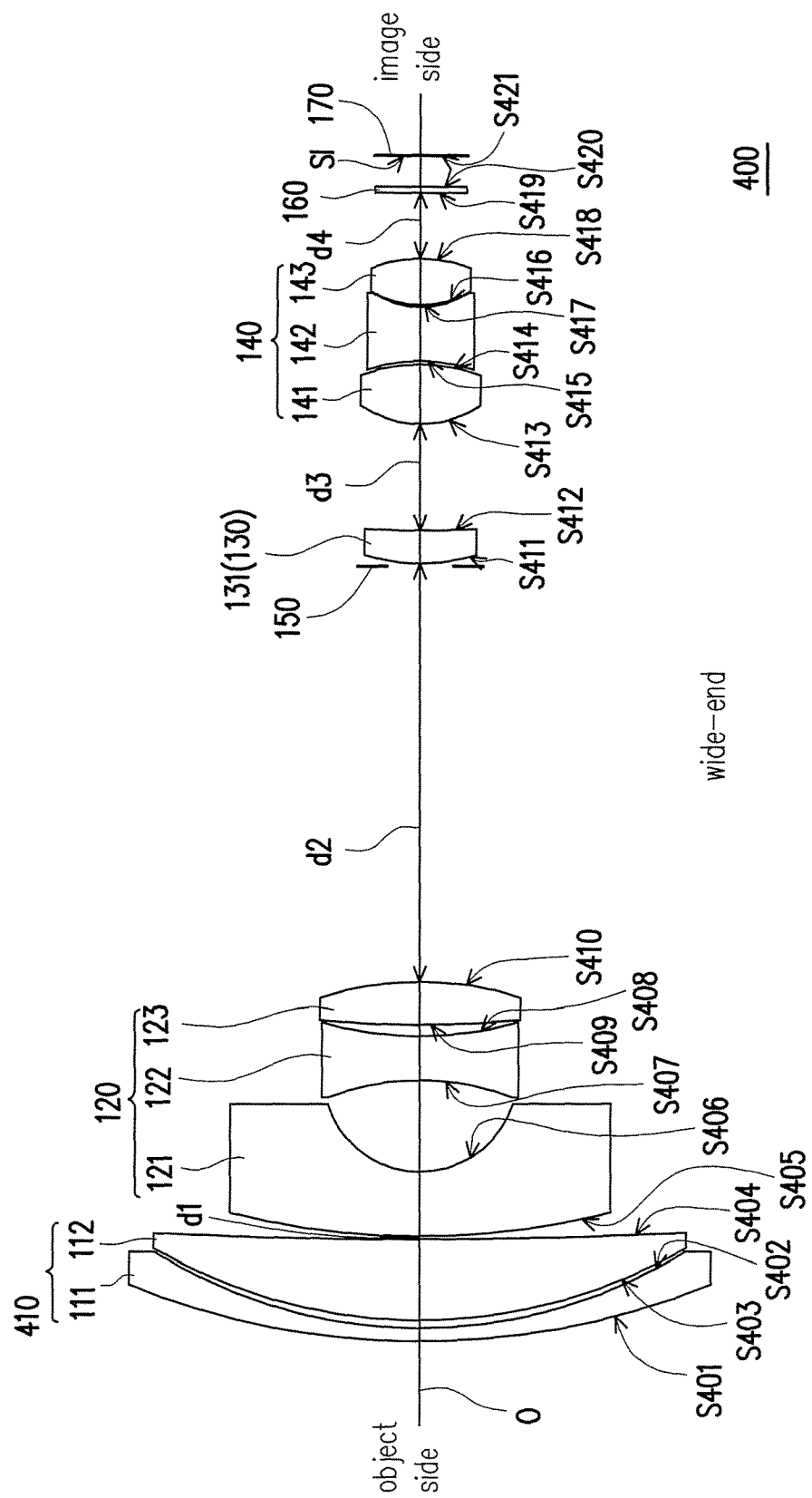
FIG. 4A to FIG. 4B are schematic diagrams illustrating a zoom lens according to another embodiment of the invention with a focal length respectively at the wide-end and the tele-end.
Figure 4B:
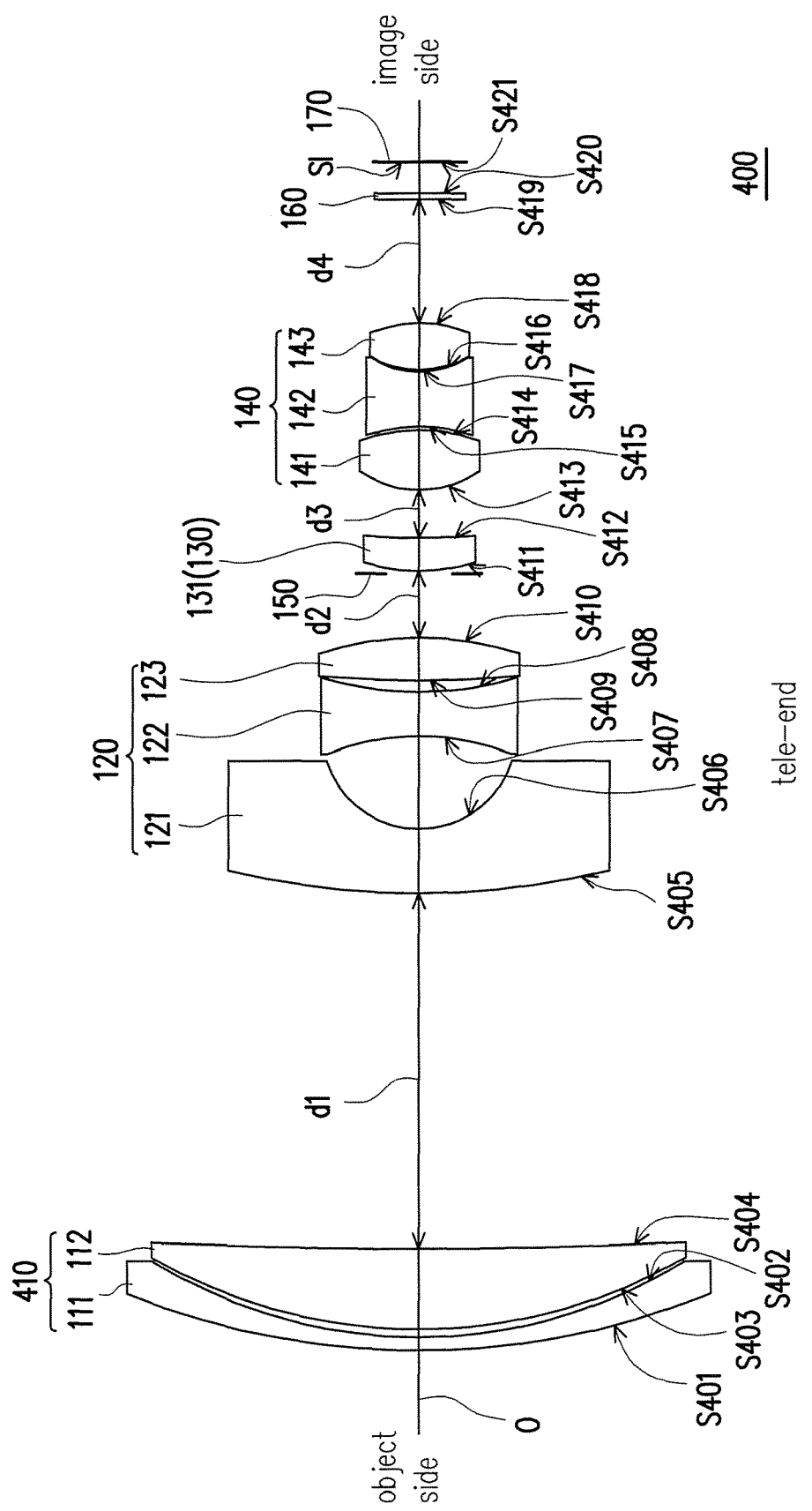

FIG. 4A to FIG. 4B are schematic diagrams illustrating a zoom lens according to another embodiment of the invention with a focal length respectively at the wide-end and the tele-end. Referring to FIG. 4A to FIG. 4B, a zoom lens 400 of the embodiment is similar to the zoom lens 100 depicted in FIG. 1A to FIG. 1B, a difference between the two is described as below. In the zoom lens 400 of the embodiment, a distance is provided between the first lens 111 and the second lens 112 of the first lens group 410, thus a double cemented lens is not constituted. Further, an abbe number of the sixth lens 131 of the third lens group 130 is greater than 70.

Furthermore, in the embodiment, operational mechanisms of the zoom lens 400 are similar to operational mechanisms of the zoom lens 100, and similar details can refer to above paragraphs, thus related description is omitted hereinafter. In the embodiment, since the zoom lens 400 and the zoom lens 100 are of similar structures, thus the zoom lens 400 has the same advantages of the zoom lens 100 as mentioned above, which are also omitted hereinafter.

An embodiment of the zoom lens 400 is described below. However, the invention is not limited to the data listed below. It should be known to those ordinary skilled in the art that various modifications and variations can be made to the structure of the present invention without departing from the scope or spirit of the invention after referring to the invention.

TABLE 4

| Surface | Radius of Curvature (mm) | Distance (mm) | Refractive Index | Abbe Number | Notes |
|---|---|---|---|---|---|
| Object Side | Infinity | 1000 |  |  |  |
| S401 | 47.49 | 1.00 | 1.85 | 23.8 | First Lens |
| S402 | 32.70 | 0.46 |  |  |  |
| S403 | 33.87 | 5.12 | 1.77 | 49.6 | Second Lens |
| S404 | 448.64 | Variable Distance (d1) |  |  |  |
| S405 | 47.95 | 4.19 | 1.83 | 37.2 | Third Lens |
| S406 | 6.24 | 5.81 |  |  |  |
| S407 | −14.26 | 2.83 | 1.53 | 56.0 | Fourth Lens |
| S408 | 17.25 | 0.71 |  |  |  |
| S409 | 115.96 | 2.68 | 1.85 | 23.8 | Fifth Lens |
| S410 | −21.58 | Variable Distance (d2) |  |  |  |
| S411 | 12.79 | 2.06 | 1.50 | 81.6 | Sixth Lens (Aperture Stop) |
| S412 | 36.55 | Variable Distance (d3) |  |  |  |
| S413 | 6.01 | 3.82 | 1.51 | 64.1 | Seventh Lens |
| S414 | −7.99 | 0.12 |  |  |  |
| S415 | −12.51 | 3.56 | 1.83 | 37.2 | Eighth Lens |
| S416 | 5.26 | 0.16 |  |  |  |
| S417 | 5.79 | 2.94 | 1.50 | 81.6 | Ninth Lens |
| S418 | −8.40 | Variable Distance (d4) |  |  |  |
| S419 | Infinity | 0.40 | 1.52 | 64.2 | Infrared Cut Filter |
| S420 | Infinity | 2.00 |  |  |  |

TABLE 4-continued

| Surface | Radius of Curvature (mm) | Distance (mm) | Refractive Index | Abbe Number | Notes |
|---|---|---|---|---|---|
| S421 | Infinity | 0.00 | | | Image Sensing Element |

In Table 4, "Radius of Curvature" refers to a radius of curvature of each surface, and "Distance" refers to a distance between two adjacent surfaces along the optical axis O. For instance, the distance for the surface S401 is a distance from the surface S401 to the surface S402 on the optical axis O. "Thickness," "Refractive Index," and "Abbe number" corresponding to each of the lenses listed in the "Notes" column can be found in the corresponding values for the distance, refractive index, and abbe number from each row. Moreover, the surfaces S401 and S402 are two surfaces of the first lens 111, and the surfaces S403 and S404 are two surfaces of the second lens 112. The surfaces S405 and S406 are two surfaces of the third lens 121. The surfaces S407 and S408 are two surfaces of the fourth lens 122. The surfaces S409 and S410 are two surfaces of the fifth lens 123. The surfaces S411 and S412 are two surfaces of the sixth lens 131, and the aperture stop 150 is located on the surface S411 of the sixth lens 131 facing the object side. The surfaces S413 and S414 are two surfaces of the seventh lens 141. The surfaces S415 and S416 are two surfaces of the eighth lens 142. The surfaces S417 and S418 are two surfaces of the ninth lens 143. The surfaces S419 and S420 are two surfaces of the IR cut filter 160. The surface S421 is the imaging surface SI of the image sensing element 170.

In view of above, the surfaces S407, S408, S413 and S414 are of aspheric surfaces, and a formula thereof is identical to the formula adapted by Table 1, in which physical meaning of each parameter can refer to the description for Table 1, thus it is omitted hereinafter. The aspheric coefficients and each value of the parameters of the surfaces S407, S408, S413 and S414 are as shown in Table 5.

TABLE 5

| Surface | K | A | B | C | D |
|---|---|---|---|---|---|
| S407 | 0 | 1.4770E−004 | 8.2835E−007 | 4.3840E−008 | −2.0200E−009 |
| S408 | 0 | −2.3376E−004 | 5.9724E−006 | −2.4589E−007 | 2.0312E−009 |
| S413 | 0 | −2.6466E−004 | 4.3108E−006 | −8.6342E−007 | 4.0096E−008 |
| S414 | 0 | 1.1631E−003 | −1.7776E−005 | 6.6606E−007 | −3.2955E−008 |

In Table 6, a number of important parameters gathered when the focal length of the zoom lens 400 is at the wide-end and the tele-end, which includes the effective focal length, the field of view, the f-number and the variable distances d1, d2, d3 and d4.

TABLE 6

| | | Wide-end | Tele-end |
|---|---|---|---|
| EFL (mm) | | 3.0 | 14.27 |
| F-number | | 1.98 | 2.48 |
| FOV (degrees) | | 90.00° | 22.00° |
| Variable Distance (mm) | d1 | 0.12 | 26.42 |
| | d2 | 26.71 | 0.41 |
| | d3 | 6.75 | 0.86 |
| | d4 | 4.11 | 10.00 |

As shown in Table 6, since the f-number of the zoom lens 400 of the embodiment can be as small as 1.98, thus an advantage of larger aperture is provided. Meanwhile, as a ratio of the zoom lens 400 when zooming between the wide-end and the tele-end being approximately 1.25, the f-number can maintain stabilized, thus an advantage of configuration without an adjustable aperture (i.e., a variable iris) is provided. In addition, since the field of view of the zoom lens 400 at the wide-end reaches 90°, an advantage of wide angle is provided.

In the embodiment, since the zoom 400 and the zoom lens 100 are of similar structures, thus the zoom lens 400 has favorable imaging quality at the tel-end and the wide-end in terms of the distortion, the field curvature and the lateral color. Therefore, the zoom lens 400 of the embodiment can provide advantages of small size, a large aperture, high magnification, a wide angle and low costs, while maintaining favorable imaging quality.

In summary, the zoom lens according to the embodiments of the invention is provided with the first lens group, the second lens group, the third lens group and the fourth lens group with refractive powers respectively being positive, negative, positive and positive, in which the fourth lens group has at least one aspheric lens, and is designed to reduce the aberration. Further, in the zooming process, owing to the connecting mechanisms in the zoom lens being simpler, besides reducing the costs, the zoom lens can also provide the advantage of small size. On the other hand, the f-number of the zoom lens in one embodiment can be as small as 1.94, thus the advantage of larger aperture is provided; and the field of view of the zoom lens at the wide-end reaches 90°, thus an advantage of wide angle is provided. Moreover, when zooming between the wide-end and the tele-end, the f-number of the zoom lens does not change much. Therefore, the zoom lenses 100 and 400 of the embodiments can adopt the aperture stop 150 having the aperture size being fixed, thus the advantage of the configuration without the variable iris is provided. Accordingly, the mechanical members and driving motors of the zoom lens can be reduced to reduce a size of the zoom lens, so as to reduce the difficulty of assembling the zoom lens and the production costs of the zoom lens, thereby improving the production yield rate.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention," "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A zoom lens comprising:
a first lens group disposed between an object side and an image side and having at least one aspheric surface, the first lens group comprising a first lens, a second lens, and a third lens arranged in sequence from the object side towards the image side;
a second lens group having a positive refractive power and disposed between the first lens group and the image side, the second lens group comprising a fourth lens; and
a third lens group having a positive refractive power and disposed between the second lens group and the image side, the third lens group having at least one aspheric surface, the third lens group comprising a fifth lens, a sixth lens, and a seventh lens, wherein the third lens group is suitable to move relative to the second lens group for focusing, and the second lens and the fifth lens are aspheric lenses.

2. The zoom lens as claimed in claim 1 further comprising an aperture stop disposed between the first lens group and the second lens group, wherein an aperture size of the aperture stop remains unchanged.

3. The zoom lens as claimed in claim 1, wherein a position of the second lens group remain fixed in the zoom lens, and the first lens group is suitable to move relative to the second lens group for the zoom lens to zoom between a wide-end and a tele-end.

4. The zoom lens as claimed in claim 3, wherein the zoom lens satisfies $0.7<H/f_w$, wherein $f_w$ is an effective focal length of the zoom lens switched to the wide-end, and H is a half image height, the half image height is defined as a distance from a point of an image frame formed on an imaging surface of an imaging sensing element on the object side, being farthest away from an optical axis of the zoom lens, to the optical axis, and said distance refers to a distance in a direction perpendicular to the optical axis.

5. The zoom lens as claimed in claim 3, wherein the zoom lens satisfies $|f_w/f1|<0.6$, wherein $f_w$ is an effective focal length of the zoom lens switched to the wide-end, and f1 is an effective focal length of the first lens group.

6. The zoom lens as claimed in claim 3, wherein the zoom lens satisfies $|f_w/f3|<0.5$, wherein $f_w$ is an effective focal length of the zoom lens switched to the wide-end, and f3 is an effective focal length of the third lens group.

7. The zoom lens as claimed in claim 1, wherein the zoom lens satisfies $1.2<|fn_T/fn_w|\leq 2.5$, wherein $fn_T$ is a f-number of the zoom lens switched to a tele-end, and $fn_w$ is a f-number of the zoom lens switched to a wide-end.

8. The zoom lens as claimed in claim 1, wherein the first lens group has a negative refractive power.

9. The zoom lens as claimed in claim 1, wherein refractive powers of the first lens, the second lens, the third lens, the fourth lens, the fifth lens, the sixth lens, and the seventh lens are respectively negative, negative, positive, positive, positive, negative and positive.

10. A zoom lens comprising:
a first lens group disposed between an object side and an image side;
a second lens group having a positive refractive power and disposed between the first lens group and the image side; and
a third lens group having a positive refractive power and disposed between the second lens group and the image side, wherein a zoom ratio of the zoom lens when zooming between a wide-end and a tele-end ranges from 1.25 to 1.5, and the zoom lens satisfies $|f_w/f3|<0.5$, wherein $f_w$ is an effective focal length of the zoom lens switched to the wide-end, and f3 is an effective focal length of the third lens group.

11. The zoom lens as claimed in claim 10 further comprising an aperture stop disposed between the first lens group and the second lens group, wherein an aperture size of the aperture stop remains unchanged.

12. The zoom lens as claimed in claim 10, wherein the zoom lens satisfies $0.7<H/f_w$, wherein $f_w$ is an effective focal length of the zoom lens switched to the wide-end, and H is a half image height, the half image height is defined as a distance from a point of an image frame formed on an imaging surface of an imaging sensing element on the object side, being farthest away from an optical axis of the zoom lens, to the optical axis, and said distance refers to a distance in a direction perpendicular to the optical axis.

13. The zoom lens as claimed in claim 10, wherein the zoom lens satisfies $|f_w/f1|<0.6$, wherein $f_w$ is an effective focal length of the zoom lens switched to the wide-end, and f1 is an effective focal length of the first lens group.

14. The zoom lens as claimed in claim 10, wherein the zoom lens satisfies $1.2<|fn_T/fn_w|\leq 2.5$, wherein $fn_T$ is a f-number of the zoom lens switched to a tele-end, and $fn_w$ is a f-number of the zoom lens switched to a wide-end.

15. The zoom lens as claimed in claim 10, wherein the first lens group has a negative refractive power, the first lens group comprises a first lens, a second lens, and a third lens arranged in sequence from the object side towards the image side, the second lens group comprises a fourth lens, and the third lens group comprises a fifth lens, a sixth lens, and a seventh lens, wherein the second lens and the fifth lens are aspheric lenses.

16. The zoom lens as claimed in claim 15, wherein refractive powers of the first lens, the second lens, the third lens, the fourth lens, the fifth lens, the sixth lens, and the seventh lens are respectively negative, negative, positive, positive, positive, negative and positive.

* * * * *